US012323363B2

(12) United States Patent
Zhao

(10) Patent No.: US 12,323,363 B2
(45) Date of Patent: Jun. 3, 2025

(54) FEEDBACK METHOD, FEEDBACK DEVICE, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 344 days.

(21) Appl. No.: 17/775,011

(22) PCT Filed: Nov. 8, 2019

(86) PCT No.: PCT/CN2019/116791

§ 371 (c)(1),
(2) Date: May 6, 2022

(87) PCT Pub. No.: WO2021/088009

PCT Pub. Date: May 14, 2021

(65) Prior Publication Data

US 2022/0368504 A1 Nov. 17, 2022

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1854; H04L 5/0053; H04L 1/1861; H04L 5/0064; H04W 72/569; H04W 4/40; H04W 72/1268; H04W 72/21; H04W 76/14; H04W 92/18; H04W 72/53; H04W 72/232
See application file for complete search history.

(56) References Cited

U.S. PATENT DOCUMENTS

2022/0279561 A1* 9/2022 Marinier ............... H04L 5/0053
2023/0144397 A1* 5/2023 Ye ......................... H04L 1/0072 370/329

FOREIGN PATENT DOCUMENTS

| | | | |
|---|---|---|---|
| KR | 20120019546 | A | 3/2012 |
| WO | WO 2017171528 | A1 | 10/2017 |
| WO | WO 2018231728 | A1 | 12/2018 |
| WO | WO 2019031998 | A1 | 2/2019 |
| WO | WO 2020168574 | A1 | 8/2020 |

OTHER PUBLICATIONS

PCT/CN2019/116791 International Search Report dated Jul. 29, 2020; 2 pages.

(Continued)

*Primary Examiner* — Pamit Kaur
(74) *Attorney, Agent, or Firm* — Cozen O'Connor

(57) ABSTRACT

A feedback method, a feedback apparatus, and a storage medium are provided. The feedback method includes: determining that a resource of a first physical uplink control channel (PUCCH) for transmitting sidelink feedback information overlaps with a resource of a second physical uplink channel for transmitting other uplink information in a time domain, in which the other uplink information is uplink information different from the sidelink feedback information; and transmitting the first PUCCH or transmitting the second physical uplink channel.

13 Claims, 2 Drawing Sheets

(56) References Cited

OTHER PUBLICATIONS

Huawei, HiSilicon "Sidelink resource allocation mode 1" 3GPP TSG RAN WG1 Meeting #98bis; R1-1910055; Oct. 2019; 19 pages.
Asia Pacific Telecom "Discussion on SL Mode-1 Resource Allocation"; 3GPP TSG-RAN WG1 Meeting #98bis; R1-1910848; Oct. 2019; 4 pages.
LG Electronics "Discussion on NR sidelink resource allocation for Mode 1";3GPP TSG RAN WG1 #98bis Meeting R1-1910778; Oct. 2019; 11 pages.
Indian Patent Application No. 202247032346, Office Action dated Sep. 20, 2022, 5 pages.
Japanese Patent Application No. 2022-526230, Office Action dated Apr. 18, 2023, 7 pages.
Japanese Patent Application No. 2022-526230, English translation of Office Action dated Apr. 18, 2023, 6 pages.
NTT Cocomo, Inc. "Sidelink resource allocation mechanism mode 1 for NR V2X" 3GPP TSG RAN WG1 #98bis, R1-1911169, Oct. 2019, 11 pages.
3GPP TSG RAN WG1; Re [98b-NR-13] Email discussion/approval on SL HARQ-ACK multiplexing, [online], Nov. 2019, 3 pages.
European Patent Application No. 19951626.1, extended Search and Opinion dated Jun. 20, 2023, 10 pages.
NTT Docomo, Inc. "NR Sidelink Resource Allocation Mechanism Mode 1" 3GPP TSG RAN WG1 #98, R1-1909186, Aug. 2019, 7 pages.
Korean Patent Application No. 10-2022-7019114, Office Action dated Mar. 20, 2025, with English translation, 9 pages15.

* cited by examiner

FEEDBACK METHOD, FEEDBACK DEVICE, AND STORAGE MEDIUM

CROSS-REFERENCE TO RELATED APPLICATION

This application is a U.S. national phase of International Application No. PCT/CN2019/116791, filed with the State Intellectual Property Office of P. R. China on Nov. 8, 2019.

TECHNICAL FIELD

The disclosure relates to a field of communication technologies, and particularly to a feedback method, a feedback apparatus and a storage medium.

BACKGROUND

Recently, with the development of technologies such as autonomous driving, in order to support new vehicle to everything (V2X) businesses, new requirements are proposed for performance of the V2X technology. The 3rd generation partnership project (3GPP) has planned using 5G technologies to support the new V2X communication services and scenarios as an important content of Rel 16.

In the new radio (NR) V2X technology, unicast and groupcast businesses of sidelink communication support using a physical layer hybrid automatic repeat request (HARQ) feedback and retransmission mechanism.

SUMMARY

According to a first aspect of the embodiments of the disclosure, a feedback method is provided. The method is applied in a terminal and includes: determining that a resource of a first physical uplink control channel (PUCCH) for transmitting sidelink feedback information overlaps with a resource of a second physical uplink channel for transmitting other uplink information in a time domain, in which the other uplink information is uplink information different from the sidelink feedback information; and transmitting the first PUCCH or transmitting the second physical uplink channel.

According to a second aspect of the embodiments of the disclosure, a feedback apparatus is provided. The apparatus includes: a processor and a memory storing instructions executable by the processor. The processor is configured to the feedback method according to the first aspect or any implementation of the first aspect.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

Figure 1:
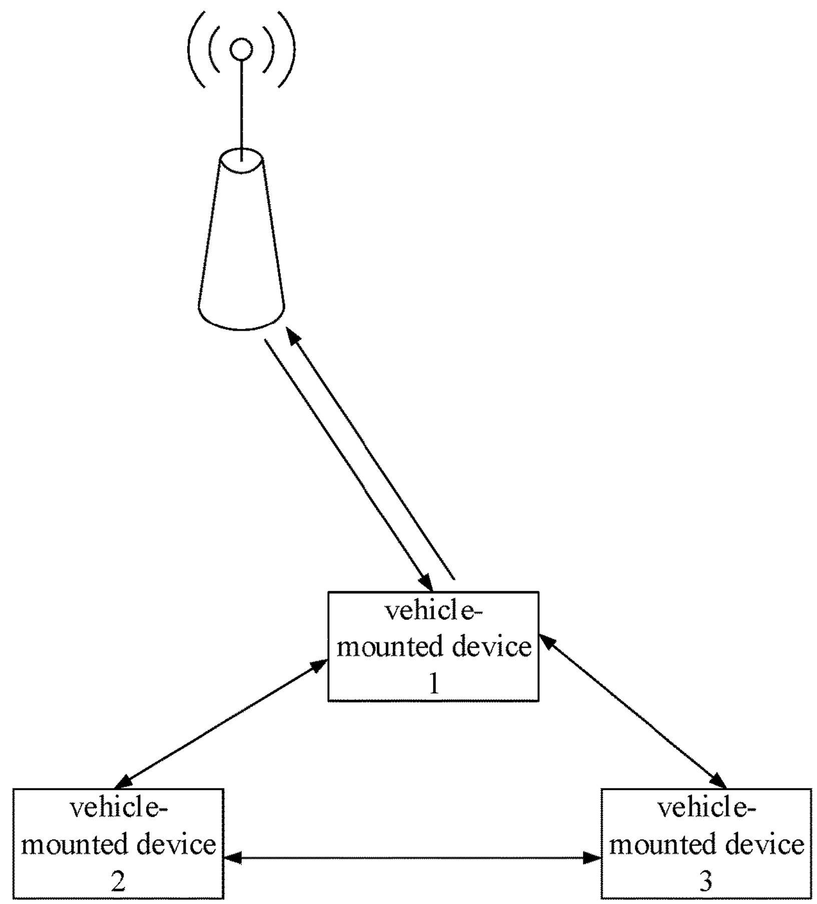
FIG. 1 is a schematic diagram illustrating a scenario in which vehicle-mounted devices perform a communication.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In the new radio (NR) V2X technology, unicast and groupcast businesses of sidelink communication support using a physical layer hybrid automatic repeat request (HARQ) feedback and retransmission mechanism. For the unicast businesses, a data receiving end feeds back an acknowledgement (ACK) when data is successfully received (data is successfully decoded), and feeds back a negative acknowledgement (NACK) when the data is not successfully received (an error occurs in decoding the data). For the groupcast businesses, two HARQ feedback methods are supported. In one method, the data receiving end only feeds back the NACK when the data is not successfully received and feeds back no signal otherwise. In the other method, each data receiving end feeds back the ACK when the data is successfully received and feeds back the NACK when the data is not successfully received.

A network device allocates a physical uplink control channel (PUCCH) time-frequency resource for transmitting sidelink data HARQ feedback to a data sending end through a downlink signaling. The network device may also allocate a PUCCH time-frequency resource for transmitting uplink information such as downlink data HARQ feedback, scheduling request (SR) and channel station information (CSI) to the data sending end through the downlink signaling. The data sending end selects the PUCCH time-frequency resources for transmitting other uplink information different from the sidelink data HARQ feedback and the sidelink data HARQ feedback based on the PUCCH time-frequency resources assigned by the network device.

However, the PUCCH time-frequency resource for transmitting the other uplink information and the PUCCH time-frequency resource for transmitting the sidelink data HARQ feedback selected by the data sending end may overlap with each other. When the PUCCH time-frequency resource for transmitting the other uplink information overlaps with the PUCCH time-frequency resource for transmitting the sidelink data HARQ feedback, how to transmit the sidelink data HARQ feedback information is inconclusive at present.

In order to overcome problems in the related art, the disclosure provides a feedback method, a feedback apparatus and a storage medium.

A feedback method provided in any embodiment of the disclosure may be applied in a communication scenario in which two devices perform a direct communication, for example a V2X scenario including a vehicle and another node. V presents a vehicle-mounted device, and X represents any object interacts with the vehicle-mounted device. Currently, X mainly includes a vehicle-mounted device, a handhold device, a roadside infrastructure and network. An information interaction mode of the V2X includes an interaction between vehicle to vehicle (V2V), vehicle to infrastructure (V2I), vehicle to pedestrian (V2P), and vehicle to network (V2N). In the disclosure, the communication scenario in which two devices perform the direct communication may be a communication scenario involving device to device (D2D). The device performing the direct communication in the embodiments of the disclosure may include a handhold device, a vehicle-mounted device, a wearable device, a computing device with a wireless communication function, or other processing device connected to a wireless modem, and various forms of user equipment (UE), mobile station (MS), terminal, terminal equipment and so on. For ease of description, the embodiments of the disclosure will be described by taking the scenario in which vehicle-mounted devices perform the direct communication as an example. The vehicle-mounted device performing the direct communication includes a vehicle-mounted device configured as a data sending end and vehicle-mounted device configured as a data receiving end.

FIG. 1 is a schematic diagram illustrating a scenario in which vehicle-mounted devices perform a communication. A network device configures various transmission parameters for data transmission for a vehicle-mounted device 1. The vehicle-mounted device 1 is configured as a data sending end. A vehicle-mounted device 2 is configured as a data receiving end. The two vehicle-mounted devices perform a direct communication. A link of performing a communication between the network device and the vehicle-mounted device includes an uplink link and a downlink link. The link between the vehicle-mounted devices is a sidelink. In cellular-vehicle to everything (C-V2X), a communication between the vehicle-mounted device and another device may realize transfer through a base station and a core network. In other words, the downlink link and the uplink link between the terminal device and the base station in an existing cellular network are used to perform the communication, also the sidelink between devices may be directly used to perform the communication. Compared to a Uu interface communication, the sidelink communication has characteristics including short time delay, small overhead and so on, such that the sidelink communication is suitable to the direct communication between the vehicle-mounted device and another surrounding device geographically near the vehicle-mounted device.

The V2X sidelink communication in the long term evolution (LTE) only can support V2X applications in some basic safety aspects, for example performing speech broadcast communication based on basic safety messages (BSMs) such as cooperative awareness messages (CAM) or decentralized environmental notification message (DENM). Recently, with the development of technologies such as autonomous driving, in order to support new vehicle to everything (V2X) businesses, new requirements are proposed for performance of the V2X technology. The 3rd generation partnership project (3GPP) has planned using 5G technologies to support the new V2X communication services and scenarios as an important content of Rel 16. 3GPP service requirement (SA1) workgroups have set some business requirements needing to be satisfied by the new V2X communication, including vehicles platooning, extended sensors, advanced driving, remote driving. In general, the NR V2S sidelink needs to provide higher communication rate, shorter communication delay, and more reliable communication quality.

Unicast and groupcast businesses of sidelink communication support using a physical layer hybrid automatic repeat request (HARQ) feedback and retransmission mechanism. For the unicast businesses, a data receiving end feeds back an acknowledgement (ACK) when data is successfully received (data is successfully decoded), and feeds back a negative acknowledgement (NACK) when the data is not successfully received (an error occurs in decoding the data). For the groupcast businesses, two HARQ feedback methods are supported. In one method, the data receiving end only feeds back the NACK when the data is not successfully received and feeds back no signal otherwise. In the other method, each data receiving end feeds back the ACK when the data is successfully received and feeds back the NACK when the data is not successfully received.

In the related art, the NR V2X supports a Mode 1 resource allocation method. A network device allocates a time-frequency resource to a terminal configured as the data sending end through a downlink signaling. The terminal configured as the data sending end uses the allocated time-frequency resource to send sidelink control information and sidelink data. There may be three cases based on different time-frequency resource allocation methods through the downlink signaling.

A, Type 1 configured grant: the network device send time-frequency resource information to the terminal through a semi-static downlink signaling (such as radio resource control (RRC) signaling), to configure for the terminal a set of cyclical time-frequency resources for sending downlink control/data.

B, Type 2 configured grant: the network device sends a semi-static downlink signaling to the terminal to configure cyclical time-frequency resources for sidelink transmission, while a size and a location of the time-frequency resource within each cycle are informed to the terminal by sending downlink control information (DCI) by the base station.

C, dynamic resource allocation: the network device allocates the time-frequency resource to the terminal for sidelink transmission by sending DCI.

When the terminal uses the mode 1 resource allocation method, the terminal configured as the data sending end is supported to transmit sidelink data HARQ feedback information to the network device through a physical uplink control channel (PUCCH). For the type 2 configured grant or the dynamically scheduled time-frequency resource allocation method, selection and configuration of the PUCCH for transmitting the sidelink data HARQ feedback information may multiplex the selection and configuration of PUCCH for transmitting downlink data HARQ. But the PUCCH resource for transmitting the sidelink data HARQ and the PUCCH resource for transmitting the downlink data HARQ are configured respectively.

For the configuration of the PUCCH resource for the sidelink data HARQ, the terminal is configured with at most four sets of PUCCH resources (for ease of description, the multiple sets of PUCCH resources configured for the sidelink data HARQ in the embodiments of the disclosure are called as sidelink data HARQ PUCCH resources). Each PUCCH resource of the sidelink data HARQ PUCCH resources corresponds to distinct payload size of the sidelink data HARQ feedback. When the sidelink data HARQ selects the PUCCH for transmission, a set of PUCCH resources is selected from a first resource set based on the payload size of the sidelink data HARQ, and one PUCCH is selected for transmitting the sidelink data HARQ from the set of PUCCH resources based on the Type 2 configured grant or an indication of the dynamically scheduled DCI.

For the configuration of the PUCCH resource for transmitting the downlink data HARQ, the terminal is configured with at most four sets of PUCCH resources (for ease of description, the multiple sets of PUCCH resources configured for the downlink data in the embodiments of the disclosure are called as downlink data HARQ PUCCH resources). Each set of PUCCH resources of the downlink data HARQ PUCCH resources corresponds to distinct payload size of uplink control information (UCI). When the downlink data HARQ selects the downlink data HARQ PUCCH resource for transmission, a set of downlink data HARQ PUCCH resources is selected from a first resource set based on the payload size of the downlink data HARQ, and one of the set of downlink data HARQ PUCCH resources is selected based on an indication of the DCI of scheduling downlink data transmission.

Further, when the PUCCH resource selected for the downlink data HARQ overlaps with the PUCCH for transmitting other UCI (such as a scheduling request (SR) or channel state information (CSI)) in a time domain, the downlink data HARQ and the other UCI are merged to be transmitted on one PUCCH. The method of selecting the PUCCH includes selecting a set of PUCCH resources based on a payload size of the merged UCI, and selecting one PUCCH resource from the set of PUCCH resources based on an indication of the DCI of scheduling downlink data transmission.

According to the above resource allocation method, a situation in which the PUCCH resource selected for the sidelink data HARQ overlaps with the PUCCH resource selected for other uplink information different from the sidelink data HARQ in a time domain may occur. For example, the other uplink information may be downlink data HARQ feedback information, the scheduling request, the channel state information or uplink data and so on. In this case, how to transmit the sidelink feedback information (sidelink data HARQ) is a problem to be solved.

The embodiments of the disclosure provide a feed method, in which when the PUCCH resource for transmitting sidelink feedback information overlaps with the PUCCH resource for transmitting other uplink information in the time domain, one of the PUCCH for transmitting sidelink feedback information and the PUCCH for transmitting other uplink information is transmitted.

In the disclosure, the PUCCH for transmitting sidelink feedback information is called as a first PUCCH, and the physical uplink channel for transmitting other uplink information which is not the sidelink feedback information is called as a second physical uplink channel. The second physical uplink channel may be a PUCCH or may be a physical uplink shared channel (PUSCH).

In an implementation, when the resource of the first PUCCH for transmitting the sidelink feedback information overlaps with the resource of the second physical uplink channel for transmitting other uplink information in the time domain, the first PUCCH is transmitted or the second physical uplink channel is transmitted.

In an implementation, when the resource of the first PUCCH for transmitting the sidelink feedback information overlaps with the resource of the second physical uplink channel for transmitting other uplink information in the time domain, the first PUCCH is transmitted and the second physical uplink channel is discarded, or the second physical uplink channel is transmitted and the first PUCCH is discarded.

Figure 2:
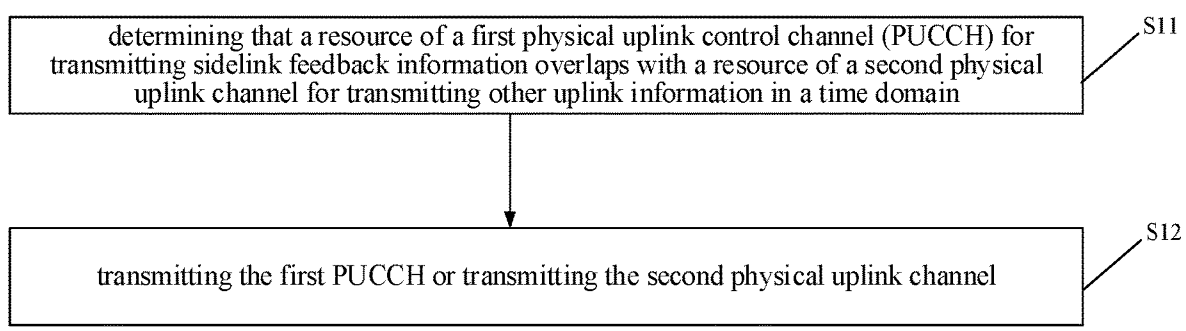
FIG. 2 is a first flowchart illustrating a feedback method according to an embodiment.

FIG. 2 is a first flowchart illustrating a feedback method according to an embodiment. As illustrated in FIG. 2, the feedback method is applied in a terminal and includes the following.

At block S11, it is determined that a resource of a first PUCCH for transmitting sidelink feedback information overlaps with a resource of a second physical uplink channel for transmitting other uplink information in a time domain.

In the embodiment of the disclosure, the sidelink feedback information may be sidelink data HARQ feedback information. The other uplink information refers to other uplink information in addition to the sidelink data HARQ feedback information, which may be uplink control information or may also be uplink data information, for example the other uplink information may be downlink data HARQ feedback information, SR, CSI report or uplink data and so on. When the other uplink information is the uplink control information, the second physical uplink channel may be a second PUCCH. When the other uplink information is the uplink data information, the second physical uplink channel may be a second PUSCH.

At block S12, the first PUCCH corresponding to the sidelink feedback information is transmitted, or the second physical uplink channel corresponding to the other uplink information is transmitted. In the embodiment of the disclosure, when the PUCCH resource for transmitting the sidelink feedback information overlaps with the physical uplink channel resource for transmitting the other uplink information in the time domain, the first PUCCH is transmitted and the second physical uplink channel is not transmitted, or the second physical uplink channel is transmitted and the first PUCCH is not transmitted, such that the transmission of uplink information can be realized in a case that slightly modifying the uplink transmission signaling, and the network device needs not to modify the signaling, thus the reception of uplink data can be implemented based on exiting data transmission methods.

It should be understood that, the first PUCCH resource not transmitted or the second physical uplink channel resource not transmitted in the embodiment of the disclosure may be discarded.

A process of transmitting the first PUCCH and not transmitting the second physical uplink channel or a process of transmitting the second physical uplink channel and not transmitting the first PUCCH will be descried below in the embodiments of the disclosure in combination with actual applications.

In an implementation, it may be determined to transmit the first PUCCH or transmit the second physical uplink channel based on configuration information. The terminal in the embodiment of the disclosure may determine to transmit the first PUCCH or transmit the second physical uplink channel based on the configuration information. When the configuration information is configured to indicate transmitting the first PUCCH, the first PUCCH is transmitted, when the configuration information is configured to indicate transmitting the second physical uplink channel, the second physical uplink channel is transmitted.

The configuration information involved in the embodiment of the disclosure may be configuration information stored in the terminal, or may also be configuration information received from another communication device, which is not limited in the embodiments of the disclosure.

For example, the sidelink feedback information is the sidelink data HARQ. The other uplink information is uplink control information (UCI). The second physical uplink channel is the second PUCCH.

When the terminal determines that the PUCCH for transmitting the UCI overlaps with the PUCCH selected for the sidelink data HARQ in the time domain, and the configuration information indicates performing uplink transmission of the UCI and not transmitting the sidelink data HARQ, the terminal determines to transmit the second PUCCH. When the terminal determines that the PUCCH for transmitting the UCI overlaps with the PUCCH selected for the sidelink data HARQ in the time domain, and the configuration information indicates performing uplink transmission of the sidelink data HARQ, the terminal determines to transmit the first PUCCH.

For another example, the sidelink feedback information is the sidelink data HARQ. The other uplink information is uplink data. The second physical uplink channel is the second PUSCH.

When the configuration information indicates transmitting the PUSCH, and the terminal determines that the PUSCH overlaps with the PUCCH selected for the sidelink data HARQ in the time domain, the PUSCH is transmitted and the first PUCCH is not transmitted. When the configuration information indicates transmitting the sidelink data HARQ, and the terminal determines that the PUSCH overlaps with the PUCCH selected for the sidelink data HARQ in the time domain, the first PUCCH is transmitted and the PUSCH is not transmitted.

In another implementation, the first PUCCH is transmitted and the second physical uplink channel is not transmitted based on uplink information content included in the other uplink information. Or the second physical uplink channel is transmitted and the first PUCCH is not transmitted based on uplink information content included in the other uplink information.

In an example, when the uplink information content included in the other uplink information may be one of CSI, SR, or merged information of CSI and SR, the first PUCCH is transmitted and the second physical uplink channel is not transmitted.

For example, the sidelink feedback information is the sidelink data HARQ. The other uplink information is UCI. The second physical uplink channel is the second PUCCH. When the information in the UCI is one of CSI, SR, or merged information of CSI and SR, the first PUCCH is transmitted and the second physical uplink channel is not transmitted. For another example, the sidelink feedback information is the sidelink data HARQ. The second physical uplink channel is the second PUSCH. When the other uplink information is one of CSI, SR, or merged information of CSI and SR, the first PUCCH is transmitted and the PUSCH is not transmitted.

In another example, when the other uplink information includes either or both of uplink data and downlink data feedback information, the first PUCCH is transmitted and the second physical uplink channel is not transmitted, or the second physical uplink channel is transmitted and the first PUCCH is not transmitted based on a data transmission priority corresponding to the sidelink feedback information and a data transmission priority corresponding to the other uplink information. The data transmission priority may be, for example, a priority of quality of service (QoS).

In an implementation, when the data transmission priority corresponding to the other uplink information is higher than the data transmission priority corresponding to the sidelink feedback information, the second physical uplink channel is transmitted and the first PUCCH is not transmitted. When the data transmission priority corresponding to the sidelink feedback information is higher than the data transmission priority corresponding to the other uplink information, the first PUCCH is transmitted and the second physical uplink channel is not transmitted.

For example, the sidelink feedback information is the sidelink data HARQ. The other uplink information is UCI which includes downlink data HARQ. The second physical uplink channel is the second PUCCH. When the PUCCH for transmitting the UCI overlaps with the PUCCH selected for the sidelink data HARQ in the time domain, a determination is made based on a downlink data transmission priority corresponding to the downlink data HARQ feedback and a sidelink data transmission priority corresponding to the sidelink data HARQ feedback. If the downlink data transmission priority is higher than the sidelink data transmission priority, the second PUCCH is transmitted and the first PUCCH is not transmitted, i.e., the UCI is transmitted but the sidelink data HARQ feedback is not transmitted. If the sidelink data transmission priority is higher than the downlink data transmission priority, the first PUCCH is transmitted and the second PUCCH is discarded, i.e., the sidelink data HARQ feedback is transmitted but the UCI is not transmitted.

For another example, the sidelink feedback information is the sidelink data HARQ. The second physical uplink channel is the second PUSCH. When the PUSCH overlaps with the PUCCH selected for the sidelink data HARQ in the time domain, a data transmission priority corresponding to uplink information included in the PUSCH and a sidelink data transmission priority corresponding to the sidelink data HARQ feedback are judged. When the data transmission priority corresponding to the uplink information included in the PUSCH is higher than the sidelink data transmission priority corresponding to the sidelink data HARQ feedback, the PUSCH is transmitted and the first PUCCH is discarded. When the sidelink data transmission priority corresponding to the sidelink data HARQ feedback is higher than the data transmission priority corresponding to the uplink information included in the PUSCH, the first PUCCH is transmitted and the PUSCH is discarded. The data transmission priority corresponding to the uplink information included in the PUSCH may be a priority of uplink data, for example, a priority of uplink-synchronization channel (UL-SCH). The data transmission priority corresponding to the uplink information included in the PUSCH may also be a transmission priority of data including both uplink data and multiplexed UCI.

In an embodiment of the disclosure, if the PUSCH only includes uplink data (UL-SCH), the data transmission priority of the uplink data and the sidelink data transmission priority corresponding to the sidelink data feedback are judged. In an embodiment of the disclosure, if the PUSCH includes both uplink data and multiplexed UCI (UCI piggyback), different processing methods may be used based on whether the UCI includes downlink data HARQ feedback information. If the multiplexed UCI does not include the downlink data HARQ feedback information, the data transmission priority of the uplink data and the sidelink data transmission priority corresponding to the sidelink data feedback are judged. If the multiplexed UCI includes the downlink data HARQ feedback information, a higher one of the priority of the uplink data and a priority of the downlink data corresponding to the downlink data HARQ feedback is judged with the sidelink data transmission priority corresponding to the sidelink data feedback.

In an embodiment of the disclosure, if the PUSCH only includes uplink data, and the data transmission priority corresponding to the uplink data is higher than the sidelink data transmission priority corresponding to the sidelink data feedback, the PUSCH is transmitted and the first PUCCH is not transmitted, i.e., the PUSCH is transmitted and the sidelink data HARQ is not transmitted. If the sidelink data transmission priority corresponding to the sidelink data feedback is higher than the data transmission priority corresponding to the uplink data, the first PUCCH is transmitted and the PUSCH is not discarded, i.e., the sidelink data HARQ is transmitted and the PUSCH is not transmitted.

In another implementation, the network device may configure a preconfigured priority threshold for the terminal, and it is determined to transmit the first PUCCH or transmit the second physical uplink channel based on the preconfigured priority threshold.

In an implementation, the network device preconfigures an uplink-downlink data priority threshold. When the data transmission priority corresponding to the other uplink information is higher than a preconfigured uplink-downlink data priority threshold, the second physical uplink channel is transmitted and the first PUCCH is not transmitted. When the data transmission priority corresponding to the other uplink information is lower than a preconfigured uplink-downlink data priority threshold, the first PUCCH is transmitted and the second physical uplink channel is not transmitted.

In another implementation, the network device preconfigures a sidelink data priority threshold. When the data transmission priority corresponding to the sidelink feedback information is higher than the preconfigured sidelink data priority threshold, the first PUCCH is transmitted and the second physical uplink channel is not transmitted. When the data transmission priority corresponding to the sidelink feedback information is lower than the preconfigured sidelink data priority threshold, the second physical uplink channel is transmitted and the first PUCCH is not transmitted.

In another implementation, the first PUCCH is transmitted and the second physical uplink channel is not transmitted based on a receipt time of DCI of scheduling data corresponding to the sidelink feedback information and a receipt time of DCI of scheduling data corresponding to the other uplink information. Or the second physical uplink channel is transmitted and the first PUCCH is not transmitted based on a receipt time of DCI of scheduling data corresponding to the sidelink feedback information and a receipt time of DCI of scheduling data corresponding to the other uplink information. When a receipt time of a first DCI of scheduling the data corresponding to the sidelink feedback information is later than a receipt time of a second DCI of scheduling the data corresponding to the other uplink information, the first PUCCH is transmitted and the second physical uplink channel is not transmitted. When the receipt time of the second DCI of scheduling the data corresponding to the other uplink information is later than the receipt time of the first DCI of scheduling the data corresponding to the sidelink feedback information, the second physical uplink channel is transmitted and the first PUCCH is not transmitted.

For example, the sidelink feedback information is sidelink data HARQ. The other uplink information is UCI which includes downlink data HARQ feedback. The second physical uplink channel is the second PUCCH. When the PUCCH for transmitting the UCI overlaps with the PUCCH selected for the sidelink data HARQ in the time domain, the receipt time of DCI of scheduling sidelink data transmission corresponding to the sidelink data HARQ feedback and a receipt time of DCI of scheduling downlink data transmission corresponding to the downlink data HARQ feedback are judged. If the time of the second DCI corresponding to the downlink data HARQ is later than the time of the first DCI corresponding to the sidelink data HARQ, the second PUCCH is transmitted and the first PUCCH is discarded, i.e., the UCI is transmitted and the sidelink data HARQ feedback is not transmitted. If the time of the first DCI corresponding to the sidelink data HARQ is later than the time of the second DCI corresponding to the downlink data HARQ, the first PUCCH is transmitted and the second PUCCH is discarded, i.e., the sidelink data HARQ is transmitted and the UCI is not transmitted.

For another example, the sidelink feedback information is sidelink data HARQ. The second physical uplink channel is the second PUSCH. When the PUSCH overlaps with the PUCCH selected for the sidelink data HARQ in the time domain, a receipt time of a second DCI of scheduling PUSCH transmission and a receipt time of a first DCI of scheduling the sidelink data transmission corresponding to the sidelink data HARQ feedback are judged. If the time of the second DCI of scheduling the PUSCH transmission is later than the time of the first DCI corresponding to the sidelink data HARQ, the PUSCH is transmitted and the first PUCCH is discarded, i.e., the PUSCH is transmitted and the sidelink data HARQ feedback is not transmitted. If the time of the first DCI corresponding to the sidelink data HARQ is later than the time of the second DCI of scheduling the PUSCH transmission, the first PUCCH is transmitted and the PUSCH is discarded, i.e., the sidelink data HARQ is transmitted and the PUSCH is not transmitted.

In the embodiment of the disclosure, when the PUCCH resource for transmitting the sidelink feedback information overlaps with the PUCCH resource for transmitting the other uplink information in the time domain, the first PUCCH is transmitted and the second physical uplink channel is not transmitted, or the second physical uplink channel is transmitted and the first PUCCH is not transmitted, such that the transmission of uplink information can be realized in a case that slightly modifying the uplink transmission signaling.

Based on the same concept, the embodiments of the disclosure further provide a feedback apparatus.

It may be understood that, the feedback apparatus includes hardware structure and/or software modules to implement the above functionalities. A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 3:
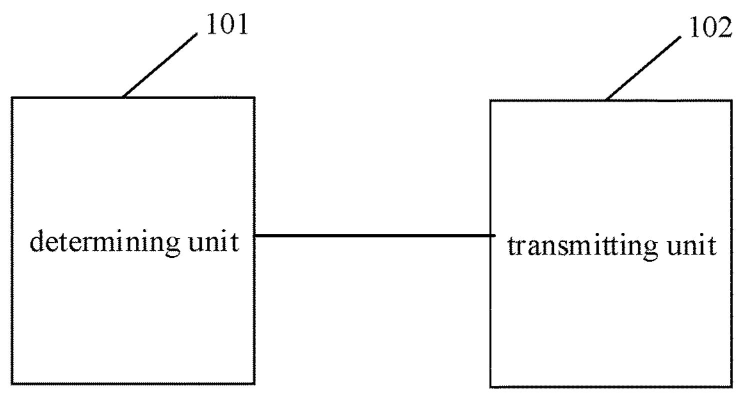
FIG. 3 is a block diagram illustrating a feedback apparatus according to an embodiment.

FIG. 3 is a block diagram illustrating a feedback apparatus according to an embodiment. As illustrated in FIG. 3, the feedback apparatus is applied in a terminal and includes a determining unit 101 and a transmitting unit 102.

The determining unit 101 is configured to determine that a resource of a first physical uplink control channel (PUCCH) for transmitting sidelink feedback information overlaps with a resource of a second physical uplink channel for transmitting other uplink information in a time domain, in which the other uplink information is uplink information different from the sidelink feedback information. The transmitting unit 102 is configured to transmit the first PUCCH or transmit the second physical uplink channel.

In an implementation, the transmitting unit 102 is configured to transmit the first PUCCH or configured to transmit the second physical uplink channel and discard the first PUCCH by: transmitting the first PUCCH in response to configuration information indicating transmitting the first PUCCH; and transmitting the second physical uplink channel in response to configuration information indicating transmitting the second physical uplink channel.

In another implementation, the transmitting unit 102 is configured to transmit the first PUCCH or transmit the second physical uplink channel by: transmitting the first PUCCH or transmitting the second physical uplink channel based on uplink information content included in the other uplink information.

In another implementation, the transmitting unit 102 is configured to transmit the first PUCCH in response to the uplink information content included in the other uplink information including one of channel state information, scheduling request information, or merged information of the scheduling request information and the channel state information.

In another implementation, the other uplink information includes either or both of uplink data and feedback information of downlink data; the transmitting unit 102 is configured to transmit the first PUCCH or transmit the second physical uplink channel based on a data transmission priority corresponding to the sidelink feedback information and a data transmission priority corresponding to the other uplink information.

In another implementation, the transmitting unit 102 is configured to: transmit the second physical uplink channel in response to the data transmission priority corresponding to the other uplink information being higher than the data transmission priority corresponding to the sidelink feedback information; and transmit the first PUCCH in response to the data transmission priority corresponding to the sidelink feedback information being higher than the data transmission priority corresponding to the other uplink information.

In another implementation, the transmitting unit 102 is configured to: transmit the second physical uplink channel in response to the data transmission priority corresponding to the other uplink information being higher than a preconfigured uplink-downlink data priority threshold, and transmit the first PUCCH in response to the data transmission priority corresponding to the other uplink information being lower than the preconfigured uplink-downlink data priority threshold; or transmit the first PUCCH in response to the data transmission priority corresponding to the sidelink feedback information being higher than a preconfigured sidelink data priority threshold and transmit the second physical uplink channel in response to the data transmission priority corresponding to the sidelink feedback information being lower than the preconfigured sidelink data priority threshold.

In another implementation, the transmitting unit 102 is configured to transmit the first PUCCH or transmit the second physical uplink channel by: transmitting the first PUCCH in response to a receipt time of first downlink control information (DCI) of scheduling data corresponding to the sidelink feedback information is later than a receipt time of second DCI of scheduling data corresponding to the other uplink information; and transmitting the second physical uplink channel in response to the receipt time of the second DCI of scheduling the data corresponding to the other uplink information is later than the receipt time of the first DCI of scheduling the data corresponding to the sidelink feedback information.

In another implementation, the transmitting unit 102 is configured to transmit the first PUCCH or transmit the second physical uplink channel by: transmitting the first PUCCH and discarding the second physical uplink channel, or transmitting the second physical uplink channel and discarding the first PUCCH.

With regard to the apparatus in the above embodiments of the disclosure, the specific operation modes of various modules have been described in detail in the method embodiments, which are not elaborated here.

Figure 4:
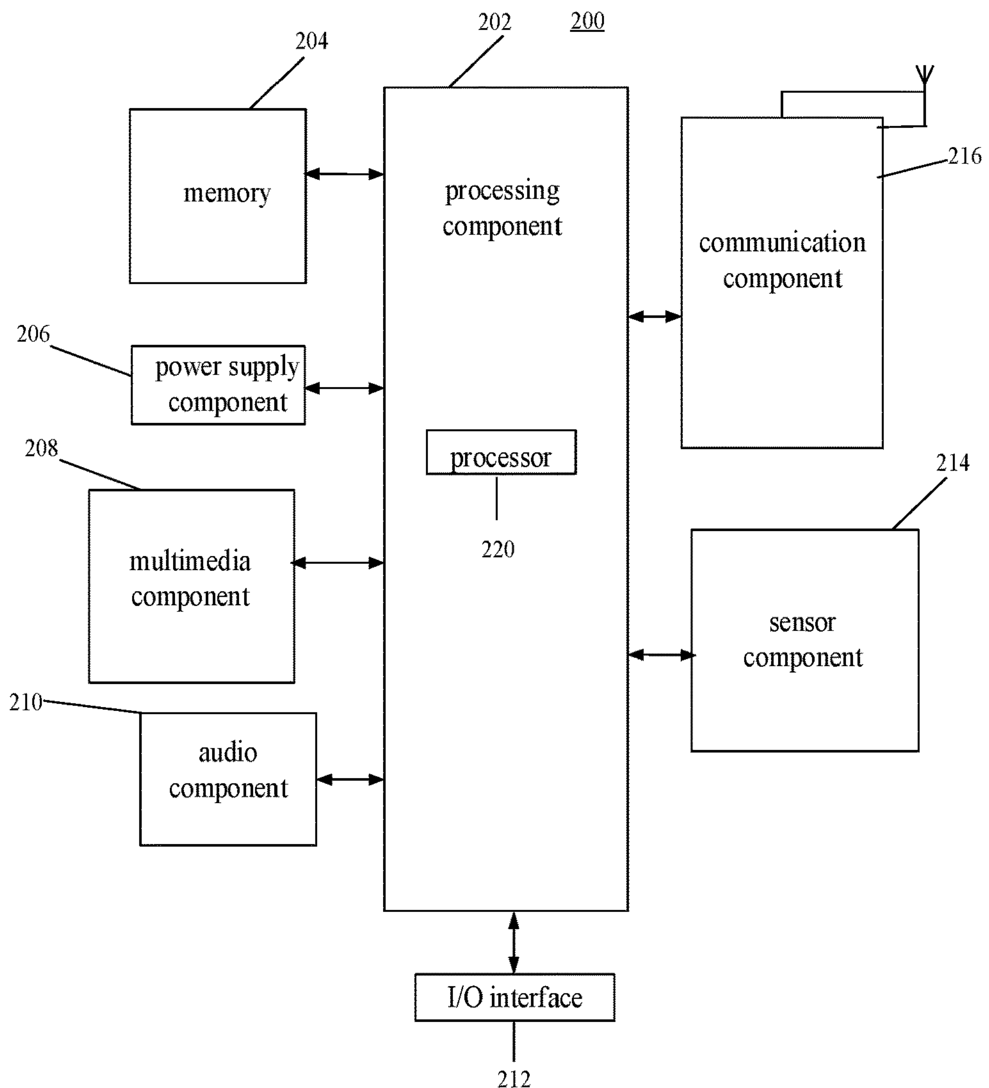
FIG. 4 is a block diagram illustrating a feedback apparatus according to another embodiment.

FIG. 4 is a block diagram illustrating a device 200 for feedback according to an embodiment. For example, the device 200 may be a mobile phone, a computer, a digital broadcast terminal, a messaging device, a gaming console, a tablet, a medical device, exercise equipment, a personal digital assistant, and the like.

Referring to FIG. 4, the device 200 may include one or more of the following components: a processing component 202, a memory 204, a power component 206, a multimedia component 208, an audio component 210, an input/output (I/O) interface 212, a sensor component 214 and a communication component 216.

The processing component 202 typically controls overall operations of the device 200, such as the operations associated with display, telephone calls, data communications, camera operations, and recording operations. The processing component 202 may include one or more processors 220 to execute instructions so as to perform all or a part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, videos, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 is configured to provide power to various components of the device 200. The power component 206 may include a power management system, one or more power sources, and other components associated with the generation, control, and distribution of power in the device 200.

The multimedia component 208 includes a screen configured to provide an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and the rear camera may receive an external multimedia datum when the device 200 is in an operation mode such as a photographing mode or a video mode. Each of the front camera and the rear camera may be a fixed optical lens system or have focus and optical zoom capability.

The audio component 210 is configured to output and/or input audio signals. For example, the audio component 210 includes a microphone ("MIC") configured to receive an external audio signal when the device 200 is in an operation mode, such as a call mode, a recording mode, and a voice recognition mode. The received audio signal may be further stored in the memory 204 or transmitted via the communication component 216. In some embodiments, the audio component 210 further includes a loud speaker to output audio signals.

The I/O interface 212 is configured to provide an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the device 200. For instance, the sensor component 214 may detect an on/off status of the device 200, relative positioning of components (e.g., a display screen and a keypad) of the device 200. The sensor component 214 may further detect a change in position of the device 200 or a component of the device 200, a presence or absence of user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may further include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate a wired or wireless communication between the device 200 and other terminals. The device 200 can access a wireless network based on a communication standard, such as Wi-Fi, 2G, or 3G, or a combination thereof. In one example embodiment, the communication component 216 receives a broadcast signal or broadcast associated information from an external broadcast control system via a broadcast channel. In one example embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In example embodiments, the device 200 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is further provided a non-transitory computer readable storage medium including instructions, such as the memory 204 including instructions executable by the processor 220 in the device 200 to perform the above-described methods. For example, the non-transitory computer-readable storage medium may be a ROM, a RAM, a CD-ROM, a magnetic tape, a floppy disc, an optical data storage device, and the like.

It should be further understood that in the present disclosure, "plurality" refers to two or more, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship. The singular forms "a," "the," and "the" are intended to include the plural forms as well, unless the context clearly dictates otherwise.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure.

It is further to be understood that, although the operations in the embodiments of the present disclosure are described in a specific order in the drawings, it should not be construed as requiring that the operations be performed in the specific order shown or the serial order, or requiring Perform all operations shown to obtain the desired result. In certain circumstances, multitasking and parallel processing may be advantageous Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

Combination of Features (A). A feedback method, applied in a terminal, comprising:

determining that a resource of a first physical uplink control channel (PUCCH) for transmitting sidelink feedback information overlaps with a resource of a second physical uplink channel for transmitting other uplink information in a time domain, wherein the other uplink information is uplink information different from the sidelink feedback information; and transmitting the first PUCCH or transmitting the second physical uplink channel.

(A1). The method as described in (A), said transmitting the first PUCCH or transmitting the second physical uplink channel comprising:

transmitting the first PUCCH in response to configuration information indicating transmitting the first PUCCH; and transmitting the second physical uplink channel in response to configuration information indicating transmitting the second physical uplink channel.

(A2). The method as described in (A), said transmitting the first PUCCH or transmitting the second physical uplink channel comprising:

transmitting the first PUCCH or transmitting the second physical uplink channel based on uplink information content comprised in the other uplink information.

(A3). The method as described in (A2), wherein, the first PUCCH is transmitted in response to the uplink information content comprised in the other uplink information comprising one of channel state information, scheduling request information, or merged information of the scheduling request information and the channel state information.

(A4). The method as described in (A2), wherein, the other uplink information comprises either or both of uplink data and downlink data feedback information;

the first PUCCH is transmitted or the second physical uplink channel is transmitted based on a data transmission priority corresponding to the sidelink feedback information and a data transmission priority corresponding to the other uplink information.

(A5). The method as described in (A4), wherein, the second physical uplink channel is transmitted in response to the data transmission priority corresponding to the other uplink information being higher than the data transmission priority corresponding to the sidelink feedback information; and the first PUCCH is transmitted in response to the data transmission priority corresponding to the sidelink feedback information being higher than the data transmission priority corresponding to the other uplink information.

(A6). The method as described in (A4), wherein, the second physical uplink channel is transmitted in response to the data transmission priority corresponding to the other uplink information being higher than a preconfigured uplink-downlink data priority threshold, and the first PUCCH is transmitted in response to the data transmission priority corresponding to the other uplink information being lower than the preconfigured uplink-downlink data priority threshold; or the first PUCCH is transmitted in response to the data transmission priority corresponding to the sidelink feedback information being higher than a preconfigured sidelink data priority threshold and the second physical uplink channel is transmitted in response to the data transmission priority corresponding to the sidelink feedback information being lower than the preconfigured sidelink data priority threshold.

(A7). The method as described in (A), said transmitting the first PUCCH or transmitting the second physical uplink channel comprising:

transmitting the first PUCCH in response to a receipt time of first downlink control information (DCI) of scheduling data corresponding to the sidelink feedback information is later than a receipt time of second DCI of scheduling data corresponding to the other uplink information; and transmitting the second physical uplink channel in response to the receipt time of the second DCI of scheduling the data corresponding to the other uplink information is later than the receipt time of the first DCI of scheduling the data corresponding to the sidelink feedback information.

(A8). The method as described in any of (A)-(A7), said transmitting the first PUCCH or transmitting the second physical uplink channel comprising:

transmitting the first PUCCH and discarding the second physical uplink channel, or transmitting the second physical uplink channel and discarding the first PUCCH.

(B). A feedback apparatus, applied in a terminal, comprising:

a determining unit, configured to determine that a resource of a first physical uplink control channel (PUCCH) for transmitting sidelink feedback information overlaps with a resource of a second physical uplink channel for transmitting other uplink information in a time domain, wherein the other uplink information is uplink information different from the sidelink feedback information; and a transmitting unit, configured to transmit the first PUCCH or transmit the second physical uplink channel.

(B1). The apparatus as described in (B), wherein the transmitting unit is configured to transmit the first PUCCH or transmit the second physical uplink channel by:

transmitting the first PUCCH in response to configuration information indicating transmitting the first PUCCH; and transmitting the second physical uplink channel in response to configuration information indicating transmitting the second physical uplink channel.

(B2). The apparatus as described in (B), wherein the transmitting unit is configured to transmit the first PUCCH or transmit the second physical uplink channel by:

transmitting the first PUCCH or transmitting the second physical uplink channel based on uplink information content comprised in the other uplink information.

(B3). The apparatus as described in (B2), wherein, the transmitting unit is configured to transmit the first PUCCH in response to the uplink information content comprised in the other uplink information comprising one of channel state information, scheduling request information, or merged information of the scheduling request information and the channel state information.

(B4). The apparatus as described in (B2), wherein, the other uplink information comprises either or both of uplink data and downlink data feedback information;

the transmitting unit is configured to transmit the first PUCCH or transmit the second physical uplink channel based on a data transmission priority corresponding to the sidelink feedback information and a data transmission priority corresponding to the other uplink information.

(B5). The apparatus as described in (B4), wherein, the transmitting unit is configured to:

transmit the second physical uplink channel in response to the data transmission priority corresponding to the other uplink information being higher than the data transmission priority corresponding to the sidelink feedback information; and transmit the first PUCCH in response to the data transmission priority corresponding to the sidelink feedback information being higher than the data transmission priority corresponding to the other uplink information.

(B6). The apparatus as described in (B4), wherein, the transmitting unit is configured to:

transmit the second physical uplink channel in response to the data transmission priority corresponding to the other uplink information being higher than a preconfigured uplink-downlink data priority threshold, and transmit the first PUCCH in response to the data transmission priority corresponding to the other uplink information being lower than the preconfigured uplink-downlink data priority threshold; or transmit the first PUCCH in response to the data transmission priority corresponding to the sidelink feedback information being higher than a preconfigured sidelink data priority threshold and transmit the second physical uplink channel in response to the data transmission priority corresponding to the sidelink feedback information being lower than the preconfigured sidelink data priority threshold.

(B7). The apparatus as described in (B), wherein the transmitting unit is configured to transmit the first PUCCH or transmit the second physical uplink channel by:

transmitting the first PUCCH in response to a receipt time of first downlink control information (DCI) of scheduling data corresponding to the sidelink feedback information is later than a receipt time of second DCI of scheduling data corresponding to the other uplink information; and transmitting the second physical uplink channel in response to the receipt time of the second DCI of scheduling the data corresponding to the other uplink information is later than the receipt time of the first DCI of scheduling the data corresponding to the sidelink feedback information.

(B8). The apparatus as described in any of (B)-(B7), wherein the transmitting unit is configured to transmit the first PUCCH or transmit the second physical uplink channel by:

transmitting the first PUCCH and discarding the second physical uplink channel, or transmitting the second physical uplink channel and discarding the first PUCCH.

(C). A feedback apparatus, comprising: a processor, a memory storing instructions executable by the processor; wherein the processor is configured to perform the feedback method as described in (A)-(A8).

(D). A non-transitory computer-readable storage medium, wherein when instructions stored in the storage medium are executed by a processor of a mobile terminal, the mobile terminal is caused to perform the feedback method as described in (A)-(A8).

What is claimed is:

1. A feedback method, performed by a terminal, comprising:

determining that a resource of a first physical uplink control channel (PUCCH) for transmitting sidelink feedback information overlaps with a resource of a second physical uplink channel for transmitting other uplink information in a time domain, wherein the other uplink information is uplink information different from the sidelink feedback information; and transmitting the sidelink feedback information on the first PUCCH or the other uplink information on the second physical uplink channel;

said transmitting the sidelink feedback information on the first PUCCH or the other uplink information on the second physical uplink channel comprising:

transmitting the sidelink feedback information on the first PUCCH or the other uplink information on the second physical uplink channel based on uplink information content comprised in the other uplink information;

wherein, the other uplink information comprises downlink data feedback information, the sidelink feedback information is transmitted on the first PUCCH or the other uplink information is transmitted on the second physical uplink channel based on a data transmission priority corresponding to the sidelink feedback information and a data transmission priority corresponding to the other uplink information;

wherein, the other uplink information is transmitted on the second physical uplink channel in response to the data transmission priority corresponding to the other uplink information being higher than a preconfigured uplink-downlink data priority threshold, and the sidelink feedback information is transmitted on the first PUCCH in response to the data transmission priority corresponding to the other uplink information being lower than the preconfigured uplink-downlink data priority threshold;

wherein, transmitting the sidelink feedback information on the first PUCCH or the other uplink information on the second physical uplink channel comprises one of:

transmitting the sidelink feedback information on the first PUCCH and discarding the other uplink information on the second physical uplink channel; or transmitting the other uplink information on the second physical uplink channel and discarding the sidelink feedback information on the first PUCCH.

2. The method of claim 1, said transmitting the sidelink feedback information on the first PUCCH or the other uplink information on the second physical uplink channel comprising:

transmitting the sidelink feedback information on the first PUCCH in response to configuration information indicating transmitting the sidelink feedback information on the first PUCCH; and transmitting the other uplink information on the second physical uplink channel in response to configuration information indicating transmitting the other uplink information on the second physical uplink channel.

3. The method of claim 1, wherein, the sidelink feedback information is transmitted on the first PUCCH in response to the uplink information content comprised in the other uplink information comprising one of channel state information, scheduling request information, or merged information of the scheduling request information and the channel state information.

4. The method of claim 1, wherein, the other uplink information is transmitted on the second physical uplink channel in response to the data transmission priority corresponding to the other uplink information being higher than the data transmission priority corresponding to the sidelink feedback information; and the sidelink feedback information is transmitted on the first PUCCH in response to the data transmission priority corresponding to the sidelink feedback information being higher than the data transmission priority corresponding to the other uplink information.

5. The method of claim 1, said transmitting the sidelink feedback information on the first PUCCH or the other uplink information on the second physical uplink channel comprising:

transmitting the sidelink feedback information on the first PUCCH in response to a receipt time of first downlink control information (DCI) of scheduling data corresponding to the sidelink feedback information is later than a receipt time of second DCI of scheduling data corresponding to the other uplink information; and transmitting the other uplink information on the second physical uplink channel in response to the receipt time of the second DCI of scheduling the data corresponding to the other uplink information is later than the receipt time of the first DCI of scheduling the data corresponding to the sidelink feedback information.

6. A feedback apparatus, comprising: a processor, a memory storing instructions executable by the processor; wherein the processor is configured to perform a feedback method, comprising:

determining that a resource of a first physical uplink control channel (PUCCH) for transmitting sidelink feedback information overlaps with a resource of a second physical uplink channel for transmitting other uplink information in a time domain, wherein the other uplink information is uplink information different from the sidelink feedback information; and transmitting the sidelink feedback information on the first PUCCH or the other uplink information on the second physical uplink channel;

said transmitting the sidelink feedback information on the first PUCCH or the other uplink information on the second physical uplink channel comprising:

transmitting the sidelink feedback information on the first PUCCH or the other uplink information on the second physical uplink channel based on uplink information content comprised in the other uplink information;

wherein, the other uplink information comprises downlink data feedback information, the sidelink feedback information is transmitted on the first PUCCH or the other uplink information is transmitted on the second physical uplink channel based on a data transmission priority corresponding to the sidelink feedback information and a data transmission priority corresponding to the other uplink information;

wherein, the other uplink information is transmitted in response to the data transmission priority corresponding to the other uplink information being higher than a preconfigured uplink-downlink data priority threshold, and the sidelink feedback information is transmitted on the first PUCCH in response to the data transmission priority corresponding to the other uplink information being lower than the preconfigured uplink-downlink data priority threshold;

wherein, transmitting the sidelink feedback information on the first PUCCH or the other uplink information on the second physical uplink channel comprises one of:

transmitting the sidelink feedback information on the first PUCCH and discarding the other uplink information on the second physical uplink channel; or transmitting the other uplink information on the second physical uplink channel and discarding the sidelink feedback information on the first PUCCH.

7. The method of claim 1, wherein, the sidelink feedback information is transmitted on the first PUCCH in response to a data transmission priority corresponding to the sidelink feedback information being higher than a preconfigured sidelink data priority threshold and the other uplink information is transmitted on the second physical uplink channel in response to the data transmission priority corresponding to the sidelink feedback information being lower than the preconfigured sidelink data priority threshold.

8. The apparatus of claim 4, said transmitting the sidelink feedback information on the first PUCCH or the other uplink information on the second physical uplink channel comprising:

transmitting the sidelink feedback information on the first PUCCH in response to configuration information of transmitting the sidelink feedback information on the first PUCCH; and transmitting the other uplink information on the second physical uplink channel in response to configuration information of transmitting the other uplink information on the second physical uplink channel.

9. The apparatus of claim 6, wherein, the sidelink feedback information is transmitted on the first PUCCH in response to the uplink information content comprised in the other uplink information comprising one of channel state information, scheduling request information, or merged information of the scheduling request information and the channel state information.

10. The apparatus of claim 6, wherein, the other uplink information is transmitted on the second physical uplink channel in response to the data transmission priority corresponding to the other uplink information being higher than the data transmission priority corresponding to the sidelink feedback information; and the sidelink feedback information is transmitted on the first PUCCH in response to the data transmission priority corresponding to the sidelink feedback information being higher than the data transmission priority corresponding to the other uplink information.

11. The apparatus of claim 6, said transmitting the sidelink feedback information on the first PUCCH or the other uplink information on the second physical uplink channel comprising:

transmitting the sidelink feedback information on the first PUCCH in response to a receipt time of first downlink control information (DCI) of scheduling data corresponding to the sidelink feedback information is later than a receipt time of second DCI of scheduling data corresponding to the other uplink information; and transmitting the other uplink information on the second physical uplink channel in response to the receipt time of the second DCI of scheduling the data corresponding to the other uplink information is later than the receipt time of the first DCI of scheduling the data corresponding to the sidelink feedback information.

12. The method of claim 1, wherein the data transmission priority comprises a quality of service (QOS) priority.

13. The method of claim 7, wherein the data transmission priority comprises a quality of service (QOS) priority.

* * * * *